United States Patent [19]
Muroi et al.

[11] Patent Number: 5,072,983
[45] Date of Patent: Dec. 17, 1991

[54] AUTOMOTIVE DOOR WITH DOOR POCKET AND TILTABLE ARMREST

[75] Inventors: Kishiro Muroi; Soushichi Koura, both of Yokohama, Japan

[73] Assignee: Ohi Seisakusho Co., Ltd., Yokohama, Japan

[21] Appl. No.: 600,766

[22] Filed: Oct. 23, 1990

[30] Foreign Application Priority Data

Oct. 26, 1989 [JP] Japan .................................. 1-124509[U]

[51] Int. Cl.⁵ .................................................. B60R 7/04
[52] U.S. Cl. ................................ 296/37.13; 296/153; 224/42.42; 297/412
[58] Field of Search .................. 296/37.12, 37.13, 153; 224/42.42; 297/412

[56] References Cited

U.S. PATENT DOCUMENTS

| | | | |
|---|---|---|---|
| 2,640,723 | 6/1953 | Lauer et al. | 296/37.12 |
| 3,666,315 | 5/1972 | Reimann | 296/153 X |
| 4,423,812 | 1/1984 | Sato | 296/37.12 X |
| 4,453,760 | 6/1984 | Hira | 296/37.13 |

FOREIGN PATENT DOCUMENTS

| | | | |
|---|---|---|---|
| 3406861 | 9/1985 | Fed. Rep. of Germany | 296/153 |
| 3708744 | 4/1988 | Fed. Rep. of Germany | 296/37.12 |
| 2577270 | 8/1986 | France | 296/37.12 |

*Primary Examiner*—Dennis H. Pedder
*Attorney, Agent, or Firm*—Foley & Lardner

[57] ABSTRACT

An automotive door having a door pocket and an armrest is shown. The armrest is pivotally movable from a normal operative position to an inclined open position to enlarge a mouth part of the door pocket. With this, a relatively large-sized article can be put into the door pocket.

7 Claims, 4 Drawing Sheets

AUTOMOTIVE DOOR WITH DOOR POCKET AND TILTABLE ARMREST

BACKGROUND OF THE INVENTION

1. Field of the Invention

The present invention relates in general to automotive doors, and more particularly, to automotive doors of a type which is equipped with both a door pocket and an armrest.

2. Description of the Prior Art

Some of automotive doors are constructed to have at their inboard sides both a door pocket and an armrest. In such automotive doors, usually, the armrest is arranged horizontally to partially border the mouth part of the door pocket. Thus, in this case, the provision of the armrest causes a difficulty in increasing the size of the mouth part of the door pocket. This means that a large-sized article can not be put into the pocket.

SUMMARY OF THE INVENTION

It is therefore an object of the present invention to provide an automotive door of the above-mentioned type, whose door pocket can put therein a relatively large-sized article irrespective of provision of an armrest.

According to the present invention, there is provided an automotive door of the above-mentioned type, whose armrest can be tilted to an inclined open position thereby to enlarge a mouth part of the door pocket.

According to the present invention, there is provided an automotive door which comprises first means for providing an inboard side of the door with a recess which serves as a door pocket; an armrest member; second means for pivoting the armrest member between an operative position wherein the armrest member extends across a mouth part of said recess and an inclined open position wherein the armrest member is kept away from the laterally facing mouth part of the recess thereby to enlarge the mouth part of the door pocket; and third means for latching the armrest member to the door when the armrest member assumes the operative position.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

Figure 1:
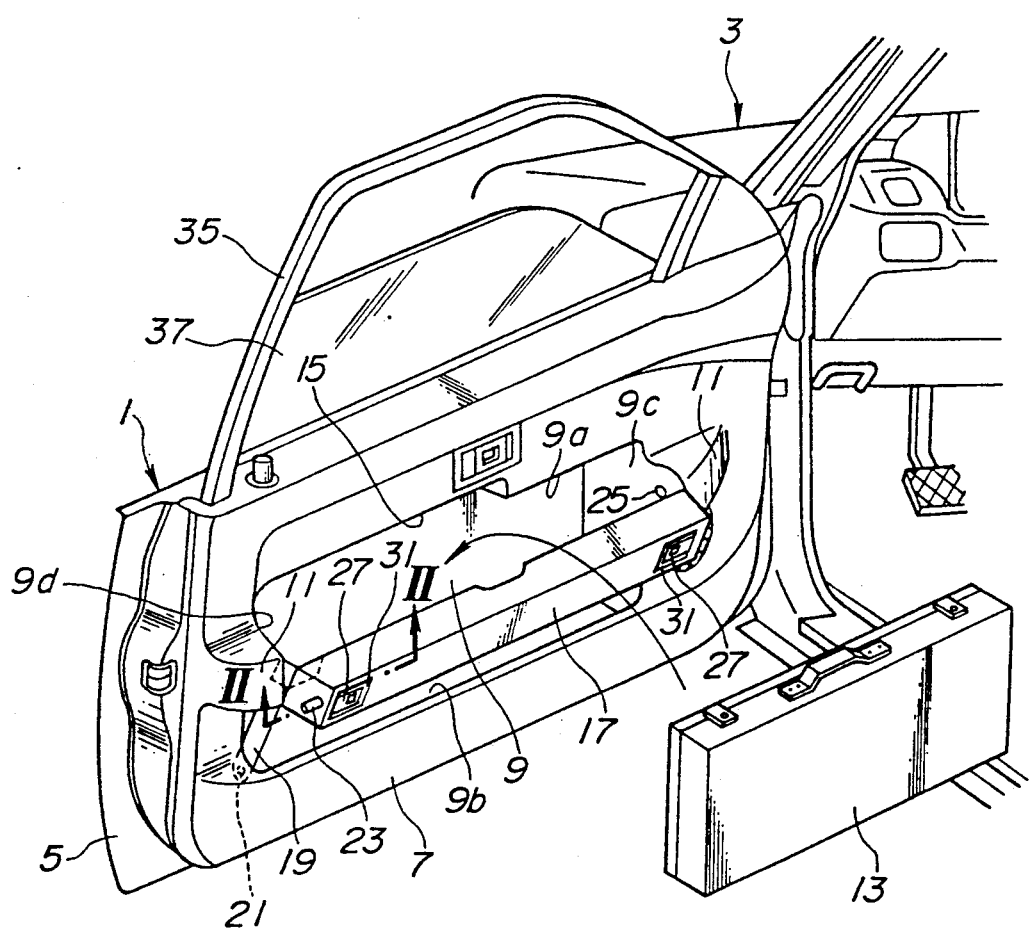
FIG. 1 is a perspective view of an automotive door of the present invention.

Referring to FIGS. 1 to 4, particularly FIG. 1 of the accompanying drawings, there is shown an automotive door 1 of the present invention, which is a front left door of a motor vehicle 3.

The door 1 shown comprises generally an outer panel 15, an inner panel (no numeral), a plastic door trim 7 which covers the inner panel, a door sash 35 and a window glass 37. Although not shown in the drawings, a known window regulator is installed in the door 1 to upwardly and downwardly move the window glass 37.

The door 1 is provided at its inboard side with a generally rectangular recess 9 which has upper, lower, front and rear side walls 9a, 9b, 9c and 9d. The recess 9 is so sized as to accommodate a relatively large-sized article, such as, attache case 13 of the like. The upper side wall 9a has a depressed flat part 15 for providing the recess 9 with an extra upper space.

The inboard side of the door 1 is formed at its front and rear ends with respective raised portions 11 which can serve as a part of the armrest as will become apparent as the description proceeds.

A tiltable armrest device is mounted to the inboard side of the door 1.

The device comprises an elongate armrest member 17 which is so sized as to span between the front and rear raised portions 11. The armrest member 17 is hollow, as is understood from FIG. 2. Hinge arms 19 extending from front and rear ends of the armrest member 17 are pivotally connected through respective pivot pins 21 to the front and rear side walls 9c and 9d of the recess 9. With this, the armrest member 17 is pivotally movable between an operative position wherein the armrest member 17 spans between the raised portions 11 and an inclined open position wherein the armrest member 17 is kept away from the raised portions 11 enlarging a mouth part of the recess 9. As is seen from FIG. 2, each hinge arm 19 has a bent end which is secured to the armrest member 17 by means of bolts "P".

In order to latch the armrest member 17 to the raised portions 11 when the same assumes the operative position, two, viz., front and rear latching devices are employed which are arranged at front and rear end portions of the armrest member 17, as shown.

Since these latching devices are identical in construction, only the rear latching device will be described in detail with reference to FIG. 2 for simplification of the description.

Figure 2:
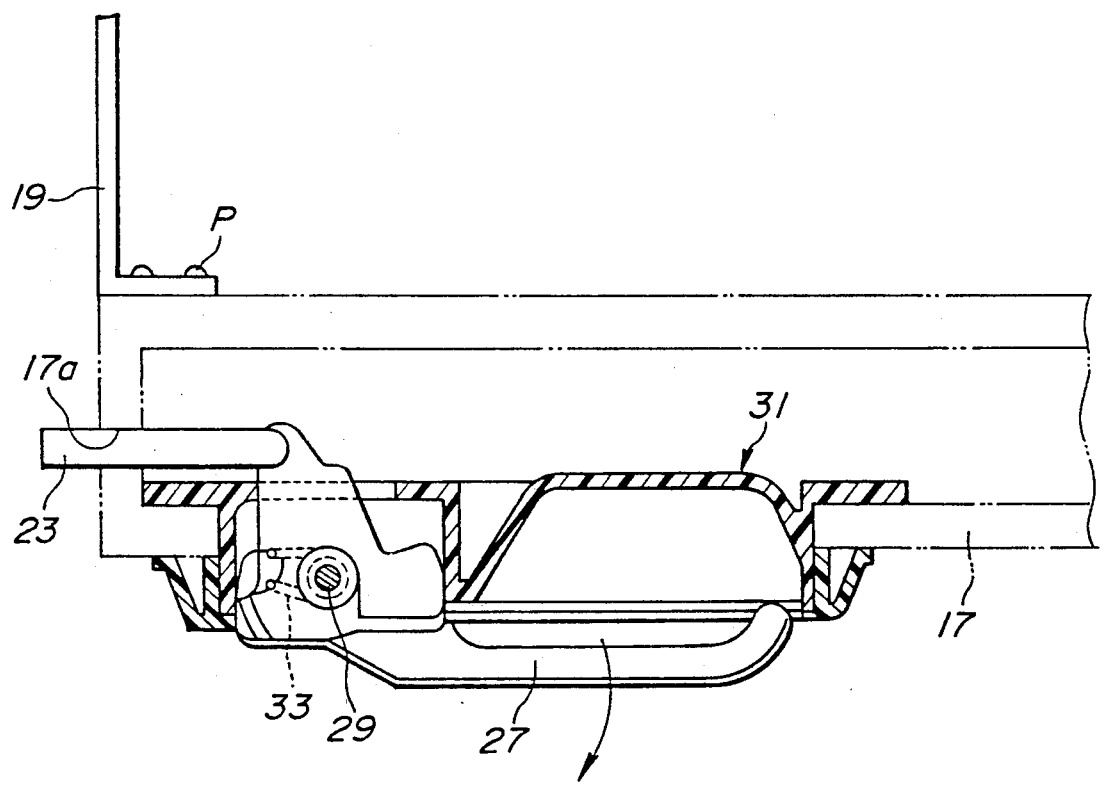
FIG. 2 is a sectional view taken along the line II—II of FIG. 1.

As is understood from FIG. 2, the latching device comprises a latch pin 23 which is axially movable held by a rear end wall of the armrest member 17. For this holding, the rear end wall is formed with an opening 17a through which the latch pin 23 slidably passes.

The rear raised portion 11 of the door 1 is formed with an opening 25 into which the latch pin 23 is latchingly inserted when the armrest member 17 is brought to the operative position.

The latch pin 23 is pivotally connected to one end of a generally L-shaped handle 27 mounted on the armrest member 17. The handle 27 is pivotally connected through a pivot shaft 29 to an escutcheon 31 which is fixed to the armrest member 17. A coil spring 33 is disposed about the pivot shaft 29 to bias the handle 27 in a counterclockwise direction in FIG. 2, that is, in a direction to project the latch pin 23 toward the outside.

It is to be noted that the front latching device has substantially the same construction as the abovementioned rear latching device.

Figure 3:
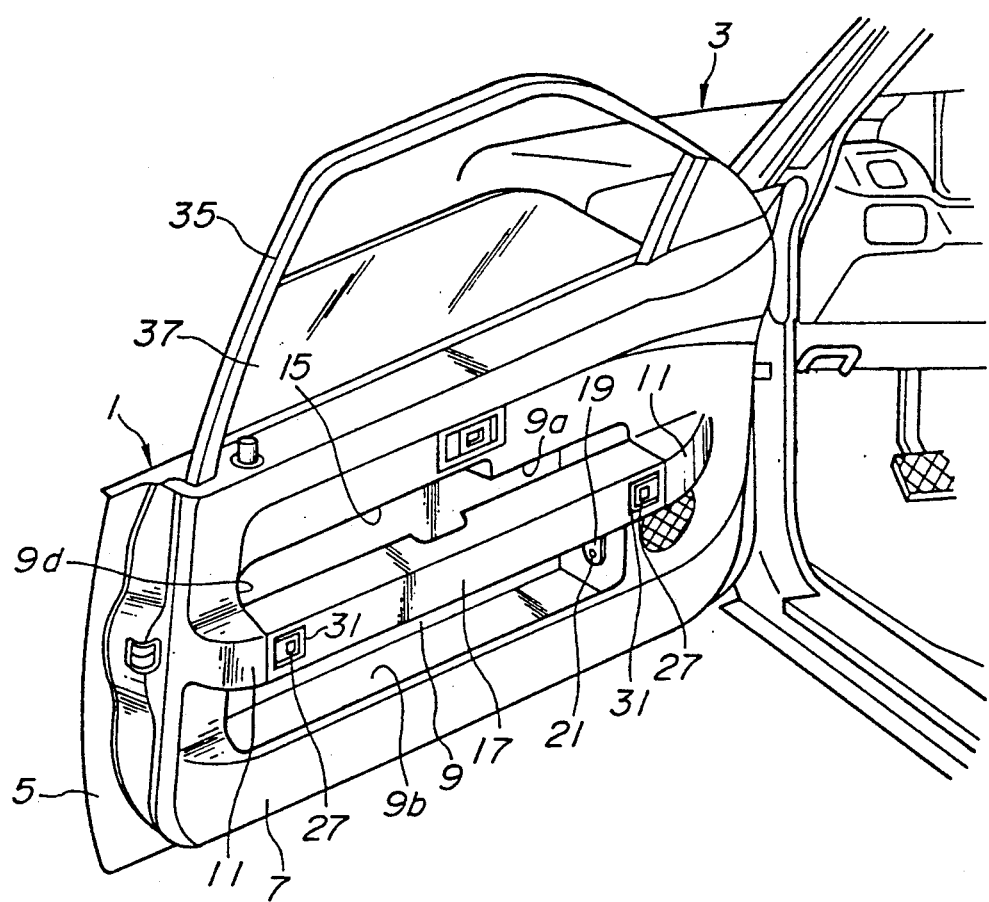
FIG. 3 is a view similar to FIG. 1, but showing a condition wherein the door pocket is empty.
Figure 4:
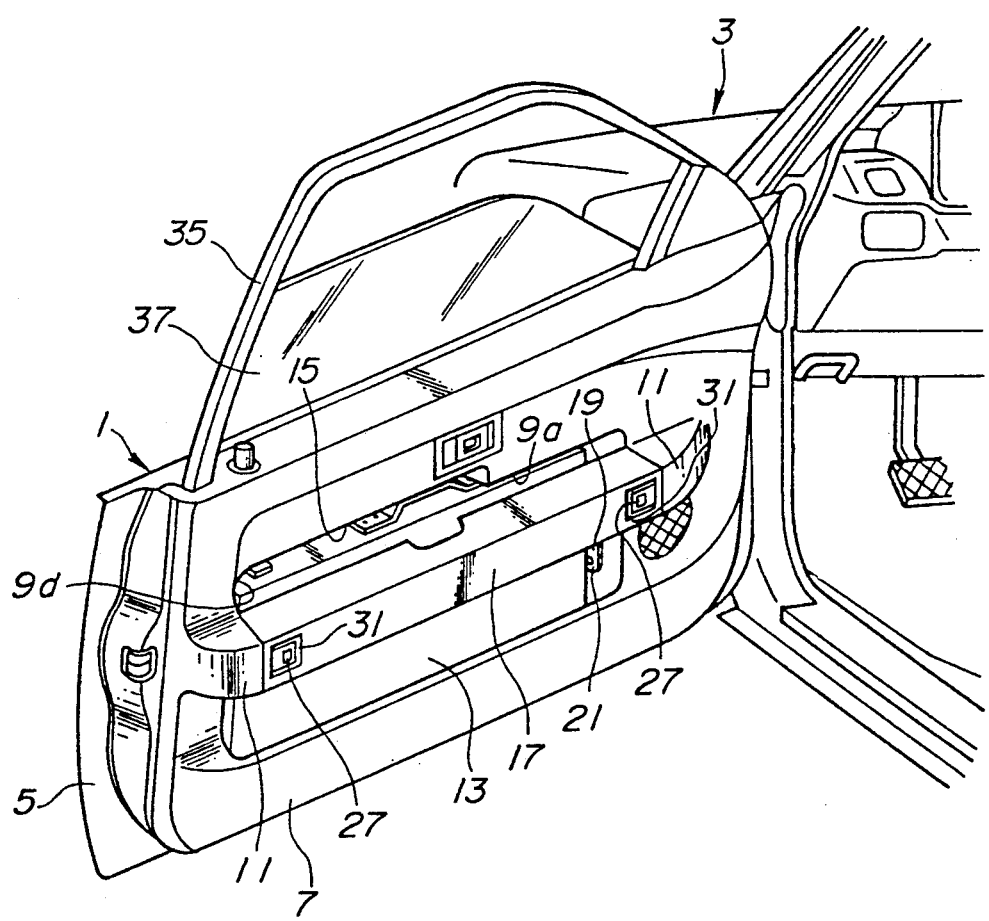
FIG. 4 is a view also similar to FIG. 1, but showing a condition wherein the door pocket receives a relatively large-sized article.

Usually, the armrest member 17 assumes the operative position, as shown in FIG. 3, wherein the armrest member 17 spans between the front and rear raised portions 11 having the latch pins 23 latchingly inserted into the corresponding openings 25 of the raised portions 11. Thus, under this condition, the armrest member 17 is stably held without play and the front and rear raised portions 11 can serve as a part of the armrest.

When now it becomes necessary to put a relatively large-sized article 13 into the recess 9 (viz., door pocket), the two handles 27 of the front and rear latching devices are pulled. With this, the latch pins 23 of the latching devices are drawn out from the corresponding openings 25 cancelling the latched condition of the armrest member 17.

Thus, further pulling of the handles 27 induces a pivotal opening movement of the armrest member 17 about a common axis of the pivot pins 21. With this, as is understood from FIG. 1, an enlarged mouth part of the recess 9 facing laterally with respect to the inboard side of the door is obtained for the relatively large-sized article 13.

After the article 13 is neatly put into the recess 9, the armrest member 17 is pushed toward the pocket 9 with the handles 27 kept pulled. When the armrest member 17 is returned to the operative position, the handles 27 are released from the operator's hands. With this, the latch pins 23 are led into the corresponding openings 25 of the raised portions 11 due to the biasing force of the coil springs 33.

When now it becomes necessary to take out the article 13 from the recess 9, substantially the same steps are taken for unlatching and tilting the armrest member 17. Due to provision of the extra upper space defined by the depressed flat part 15, removal of the article 13 from the recess 9 is easily carried out.

As will be understood from the foregoing description, because of the pivotal arrangement of the armrest member 17, the door recess 9 of the door 1 according to the present invention can receive a relatively large-sized article 13 irrespective of provision of the armrest member 17.

Although the above description is directed to an example in which two handles 27 are used for actuating the two latch pins 23, only one handle 27 may be used for actuating them. In this case, a known link mechanism is arranged between each latch pin and the handle.

What is claimed is:

1. An automotive door having an inboard side, said door comprising:
    first means for providing said inboard side of said door with a recess which serves as a door pocket said recess having a mouth part which faces generally perpendicularly with respect to said inboard side of said door;
    an elongate armrest member;
    two hinge arms extending upward from spaced lower portions of said recess, each hinge arm having an upper portion secured to one longitudinal end of said armrest member and a lower portion pivotally connected to said door, so that said armrest member can pivot about the pivoted portions of said hinge arms between an operative position wherein said armrest member extends horizontally across said mouth part of said recess leaving portions of said mouth part above and below said armrest member exposed and an inclined open position wherein said armrest member is pivoted away from said mouth part of said recess thereby to enlarge the size of the said mouth part of said recess; and
    third means for latching said armrest member to the door when said armrest member assumes said operative position.

2. An automotive door having an inboard side, said door comprising:
    first means for providing said inboard side of said door with a recess which serves as a door pocket said recess having a mouth part which faces generally perpendicularly with respect to said inboard side of said door;
    an elongate armrest member;
    a hinge arm extending upward from a lower portion of said recess, said hinge arm having an upper portion secured to said armrest member and a lower portion pivotally connected to said door, so that said armrest member can pivot about the pivoted portion of said hinge arm between an operative position wherein said armrest member extends horizontally across said mouth part of said recess leaving portions of said mouth part above and below said armrest member exposed and an inclined open position wherein said armrest member is rotated away from said inboard side of said door and is out of contact with said mouth part of said recess thereby to enlarge the size of the said mouth part of said recess; and
    third means for latching said armrest member to the door when said armrest member assumes said operative position.

3. An automotive door as claimed in claim 1 in which said inboard side of said door has an opening forward on a given portion thereof, in which said third means comprises:
    a latch pin movably held by said armrest member, said latch pin being latchingly insertable into said opening when said armrest member assumes said operative position;
    a handle carried on said armrest member, said handle being linked to said latch pin in such a manner that upon manipulation of said handle, said latch pin is drawn out from said opening; and
    biasing means for biasing said handle in a direction to achieve the latched engagement between said latch pin and said opening.

4. An automotive door as claimed in claim 3, further comprising an escutcheon which carries said handle and is fixed to said armrest member.

5. An automotive door as claimed in claim 4, in which said handle is pivotally connected to said escutcheon through a pivot shaft.

6. An automotive door as claimed in claim 5, in which said biasing means is a coil spring which is disposed about said pivot shaft.

7. An automotive door as claimed in claim 6, in which the inboard side of said door is formed with front and rear raised portions, at least one of which forms said given portion and between which said armrest member spans when the armrest member assumes said operative position.

* * * * *